Feb. 21, 1961 A. G. BORCHERS 2,972,455
INDUCED-LIFT AIRCRAFT
Filed March 13, 1956

United States Patent Office 2,972,455
Patented Feb. 21, 1961

2,972,455
INDUCED-LIFT AIRCRAFT

Ariel George Borchers, 10 4th Ave., Lambton, Germiston, Transvaal, Union of South Africa Filed Mar. 13, 1956, Ser. No. 571,233

Claims priority, application Union of South Africa Dec. 21, 1955

1 Claim. (Cl. 244—12)

This invention relates to a method of propelling a structure, such as a vessel in water, or on land and/or in particular an aircraft in air.

It is known in one form of aircraft to produce a lifting force by creating a negative air pressure over the top of a curved surface of a disc-like structure by drawing the air at a high velocity by means of an air-screw, down through an aperture in the centre of the craft. The normal atmospheric pressure on the under-side of the structure provides the required lifting force.

It is the object of this invention, for the purpose of propelling a structure, to induce a current of fluid to move at a high velocity through the structure and to utilize the energy of the fluid current to propel the structure in the desired direction.

This invention provides a method of propelling a structure by using the kinetic energy of a current of fluid induced to enter the structure in a direction substantially normal to the desired direction of movement of the structure while said fluid is discharged in a direction substantially opposite to the direction of the desired motion.

Thus, in an aircraft, the primary direction of movement would be vertically upward so that the air would flow horizontally into the structure and then be discharged vertically downward, while in the case of a vessel propelled on land or in water, the primary direction of movement would be horizontal so that the air or water, respectively, would then be drawn into the structure in a vertical plane perpendicular to the desired primary direction of movement of the structure and would be discharged horizontally from the latter in the direction opposed to the desired primary direction of horizontal movement.

This invention further provides a method by which the structure may be given a movement subsidiary to the primary direction of movement, as defined above.

The invention also provides a structure, and means embodied therein, by which the method of propulsion of the structure may be effected.

The invention may be applied to structures moving on land, or to vessels moving in or on water, or to structures moving in air. For the sake of clarity the invention will be described as applied to the latter, that is to an aircraft.

The invention is illustrated in the accompanying drawings which are diagrammatic representations of a form of aircraft conforming, by way of example, to the requirements necessary to carry the invention into practice.

Fig. 5 is a side elevational view of an aircraft embodying the invention, and wherein the flow of air through the ducts is induced by an injector.

Fig. 6 is a transverse sectional view of the aircraft of Fig. 5, and

Fig. 7 is an enlarged view similar to a part of Fig. 6 and illustrating the air flow therethrough.

Figure 1:
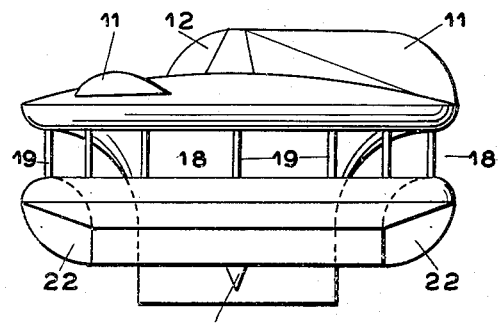
Fig. 1 shows a side elevation of the aircraft.
Figure 2:
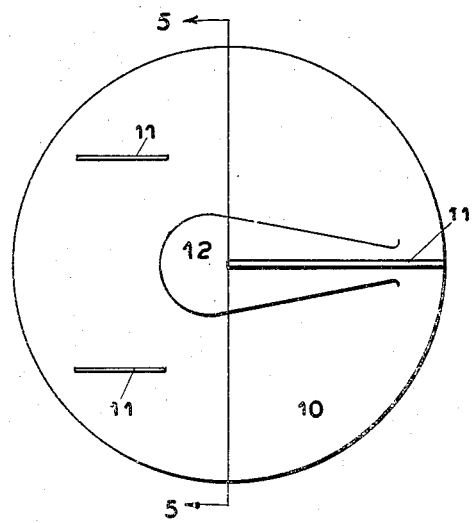
Fig. 2 is a plan of Fig. 1.

In the drawings the top surface 10 of the aircraft is essentially a smooth dome. For controlling the aircraft and its direction of movement there are provided fins 11 and a closed observation cowl 12.

The surface 10 acts as a roof to the aircraft structure. In the base 13 of the structure shown is housed an engine 14 for turning a fan 15. This fan 15 is mounted centrally of the structure and the outer portions of its blades 16 rotate horizontally in a position towards the bottom of duct 17 which duct curves therefrom upwardly and outwardly to a circular bell mouth opening 18 under the edge of surface 10.

Between the bell mouth 18 and the fan blades 16 the duct 17 makes substantially a 90° bend.

The structure below the roof 10 is attached to the upper portion of the structure by suitable means such as by the vertical struts 19 and the horizontal struts 20.

The space below the roof 10 may serve for accommodating the personnel and load carried by the aircraft.

Figure 3:
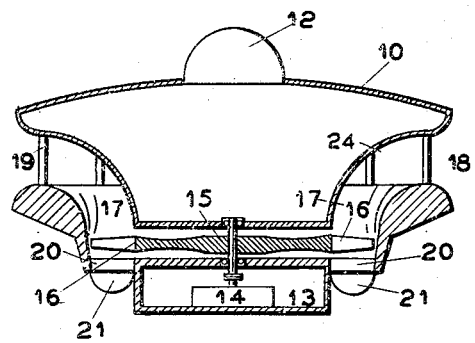
Fig. 3 is a cross sectional elevation on the line 5—5 Fig. 2.

The fan 15 draws the air in through the circular bell mouth 18 and discharges it from the bottom of the duct 17 and out past the horizontal struts 20. Struts 20 may form diffuser surfaces so that the air currents are made to impinge upon suitably placed and manipulated control surfaces 21 which deflect the air currents angularly away from the straight axial direction of axis of fan 15, so that force components are created to cause horizontal movement of the structure, as viewed in Figs. 1 and 3, and to resist rotation of the structure as a result of the reaction to rotation of the fan 15. Also there may be provided on the lower part of the structure fins 22 which are parallel to fins 11 on the surface 10.

Figure 4:
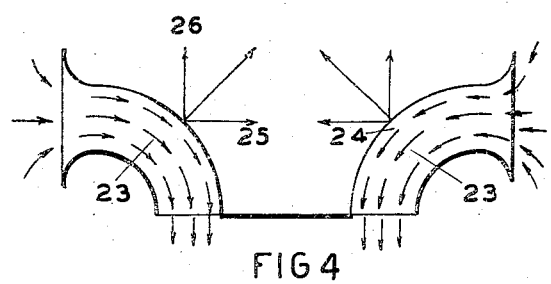
Fig. 4 is a diagram representing the forces involved.

Turning to Fig. 4 it is shown that the air stream represented by 23 is induced, at a high velocity, to pass through the circumferential duct 17. The duct 17 is designed to afford the minimum of friction to the air current 23 and the current of air passes as a moving mass having its direction of movement turned through substantially 90°. The act of bending or deviating the air current 23 will exert a force on the inner surface 24 of the duct 17, which force can be resolved into two components, namely a horizontal and a vertical thrust. The horizontal thrust will be balanced in the circle, but the vertical thrust will contribute to the lift of the structure. In Fig. 4, 25 shows the direction of the horizontal component and 26 the direction of the vertical component.

In addition there will be a reactive force due to the discharged air current expelled downwardly from the structure by the action of the fan blades 16.

The amount of useful work done will be proportioned to the weight of the air passed through the structure in the period of time considered.

The air discharged can be made to press on adjustable control surfaces 21 fastened to the structure in the slip stream from the fan 15. These surfaces may be set to direct horizontally the movement of the structure. In addition surfaces 21 should be placed to counteract any rotational movement induced by the rotating fan 15.

The invention has been described as applied to a structure in which the fluid has been induced to enter and been propelled from the structure by the use of a fan driven by an engine. It will however, be understood that the flow of the fluid may be induced by a form of injector using a jet of high velocity suitably generated in the structure.

Thus, referring to Figs. 5, 6 and 7, it will be seen that an aircraft embodying the invention may replace the fan 16 of the first described embodiment with an injector nozzle arrangement 29 situated adjacent the outlet end of duct 17 and connected by a conduit 28 to a gas turbine 27 or to an engine driven compressor so that a jet or jets of hot gases or compressed air issues downwardly from the injector nozzle arrangement 29 to induce the flow of air through duct 17, as indicated by the arrows 23 on Fig. 7.

What I claim as new and desire to secure by Letters Patent is:

An aircraft structure comprising a disc-shaped body having a domed circular top surface and a circular periphery, means defining an annular duct of curved cross-sectional configuration having an annular, bell-shaped radial opening at said periphery below the edge of said circular top surface and a downwardly directed annular opening of a cross-sectional area which is no greater than that of any upstream portion of the duct, a fan mounted for rotation about a vertical axis below said top surface and having blades including end portions extending radially across said annular duct immediately above said downwardly directed annular opening of the latter, and motor means connected to said fan for driving the latter so that said blades cause the flow of air horizontally into said duct at said bell-shaped radial opening to flow smoothly through a turn of approximately 90 degrees for vertically downward discharge from said duct at said downwardly directed annular opening, whereby a lift force is exerted on the aircraft by the centrifugal force due to the change of direction of the flow of air through said curved duct and as a result of the downward displacement of the air discharged from the duct, said propeller having a position relative to said duct which is downwstream of the bell-shaped opening, the cross-sectional area at any position in said duct being at least as large as those downstream thereof.

References Cited in the file of this patent

UNITED STATES PATENTS

| | | |
|---|---|---|
| 1,822,386 | Andersen | Sept. 8, 1931 |
| 2,377,835 | Weygers | June 5, 1945 |
| 2,461,435 | Neumann | Feb. 8, 1949 |
| 2,567,392 | Naught | Sept. 11, 1951 |
| 2,718,364 | Crabtree | Sept. 20, 1955 |
| 2,876,964 | Streib | Mar. 10, 1959 |

FOREIGN PATENTS

| | | |
|---|---|---|
| 427,290 | France | May 31, 1911 |
| 586,375 | France | Jan. 3, 1925 |